United States Patent [19]
Hamada et al.

[11] Patent Number: 5,426,708
[45] Date of Patent: Jun. 20, 1995

[54] FINGERPRINT SCANNING DEVICE FOR USE IN IDENTIFICATION

[75] Inventors: Toshio Hamada, Nagoya; Taizo Umezaki, Kasugai, both of Japan

[73] Assignee: Chuo Hatsujo Kabushiki Kaisha, Aichi, Japan

[21] Appl. No.: 74,490

[22] Filed: Jun. 11, 1993

[30] Foreign Application Priority Data

Aug. 6, 1992 [JP] Japan .................................. 4-210399

[51] Int. Cl.⁶ .......................... G06K 9/74; G06K 9/00
[52] U.S. Cl. ........................................ 382/125; 356/71
[58] Field of Search .................. 382/4, 5, 30, 34, 17; 356/71

[56] References Cited

U.S. PATENT DOCUMENTS

| | | | |
|---|---|---|---|
| 3,200,701 | 8/1965 | White | 382/4 |
| 3,231,861 | 1/1966 | French | 382/4 |
| 3,716,301 | 2/1973 | Caulfield et al. | 356/165 |
| 3,873,970 | 3/1975 | McMahon et al. | 340/146.3 E |
| 3,928,842 | 12/1975 | Green et al. | 340/146.3 Q |
| 3,944,978 | 3/1976 | Jensen et al. | 340/146.3 E |
| 4,083,035 | 4/1978 | Riganati et al. | 340/146.3 |
| 4,225,850 | 9/1980 | Chang et al. | 340/146.3 E |
| 4,414,684 | 11/1983 | Blonder | 382/4 |
| 4,827,527 | 5/1989 | Morita et al. | 382/4 |
| 4,876,725 | 10/1989 | Tomko | 382/4 |
| 4,896,363 | 1/1990 | Taylor et al. | 382/5 |
| 4,995,086 | 2/1991 | Lilley et al. | 382/4 |
| 5,144,680 | 9/1992 | Kobayashi et al. | 382/4 |

Primary Examiner—Joseph Mancuso
Assistant Examiner—David Fox
Attorney, Agent, or Firm—Pollock, Vande Sande & Priddy

[57] ABSTRACT

In a fingerprint scanning device for use in identification, a fingerprint image input device is provided to photoelectronically input a specified fingerprint of an entrant. A monochrome image data of the ridge pattern of the entrant fingerprint is stored as fingerprint image data. A feature extraction device has a calculator which treats the ridge pattern image with one-dimensional group-delay spectrum transform in X- and Y-directions. The feature extraction device has the characteristic of isolating and emphasizing peaks of the individual frequency spectra in the form of differential with respect to a phase component frequency in Fourier transform analysis, and determining group-delay spectra in X- and Y-direction respectively as fingerprint feature portions. A distinction device is provided to collate the entrant feature portion with a registrant feature portion which is registered by the fingerprint image input means so as to identify the entrant with the registrant when X-oriented and Y-oriented group-delay spectra are recognized as being the same between the entrant and the registrant by calculating whether Euclidean distances fall short of a predetermined threshold limit upon collating the individual ridge pattern image.

2 Claims, 5 Drawing Sheets

Fig. 3A
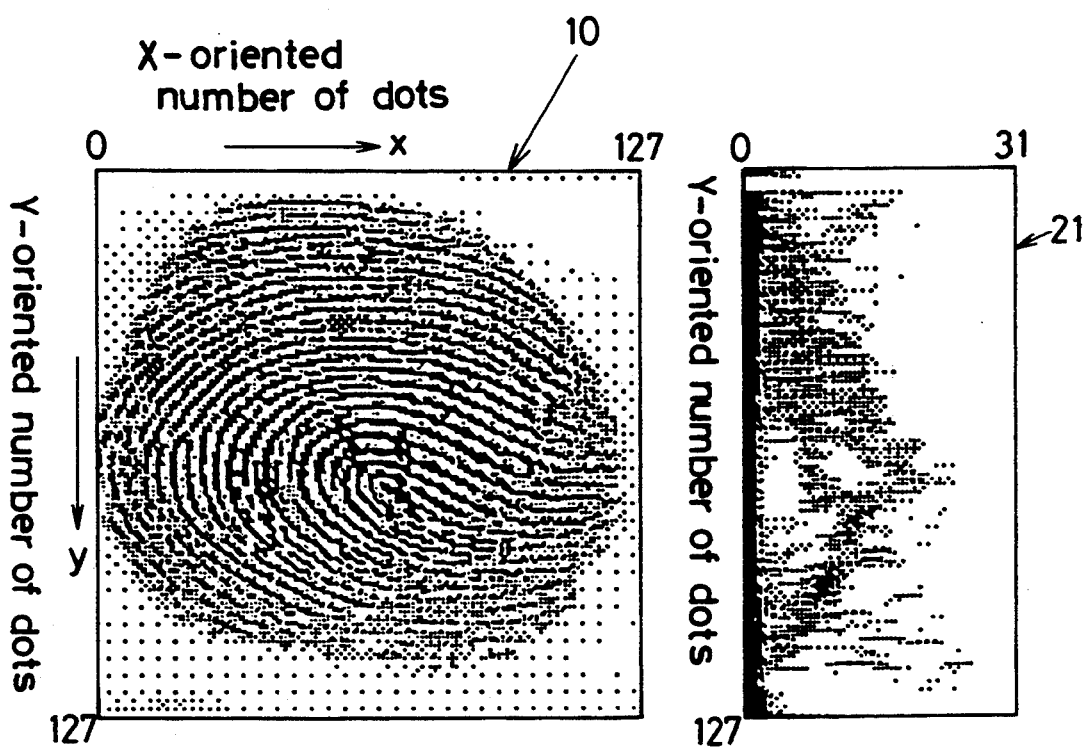
Fig. 3C
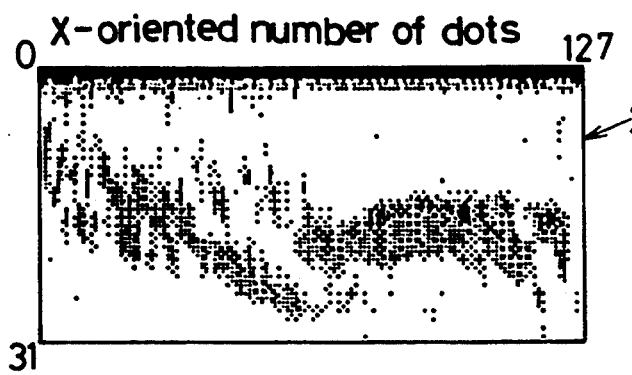
Fig. 3B two-dimensional Fourier transform

FINGERPRINT SCANNING DEVICE FOR USE IN IDENTIFICATION

BACKGROUND OF THE INVENTION

FIELD OF THE INVENTION

This invention relates to a fingerprint scanning device for use in identification.

In fingerprint scanning device for use in identification, an entrant finger is put on a lateral side of a prism so that light beams incident on a latitudinal side of the prism makes a fingerprint image emerge from through a hypotenuse of the prism. After photoelectrically treating the fingerprint image, the entrant fingerprint is collated with the registrant fingerprint as follows:

(1) As feature portions, end points and bifurcate lines of the ridge pattern are determined from the fingerprint image to store the positional relationship of the feature portions for individual data. The positional relationship of the feature portions is collated at the time of identifying the entrant with the registrant in a first device.

(2) The number of the ridge lines is counted within an area of the feature portions to store it for individual data which are collated at the time of identifying the entrant with the registrant in a second device.

(3) The individual patterns of the fingerprint image are stored for individual data, the patterns of which are collated at the time of identifying the entrant with the registrant in a third device.

The first and second devices, however, take too long a time in scanning an information data base to put them into practical use when a small scale hardware system is applied. These two devices require a relatively large storage. It becomes expensive when a large scale hardware system is applied although the time spent in scanning an information data base may be shortened.

The third device dispenses with the large scale hardward system. But the third device fails to compare the fingerprint pattern of the entrant and that of the registrant with high accuracy because the accuracy is affected by the outer disturbances such as the degree of forces and angles with which the finger is put on the prism.

Therefore, it is an object of the invention to eliminate the above drawbacks, and providing a fingerprint scanning device for use in identification which is capable of accurately collating an entrant fingerprint and a registrant fingerprint with a relatively simple structure at the time of identifying the entrant with the registrant.

SUMMARY OF THE INVENTION

According to the present invention, there is provided a fingerprint scanning device for use in identification. In the device, a fingerprint image input device is adapted to photoelectronically input a specified fingerprint of an entrant, and storing monochrome image data of a ridge pattern of the entrant fingerprint as fingerprint image data. A feature extraction device is provided to extract a frequency spectrum of the entrant ridge pattern as a feature portion of the entrant by a spectrum transform which has a characteristic to isolate and emphasize a peak of the frequency spectrum from the fingerprint image data. A distinction device is provided to collate the entrant feature portion with a registrant feature portion which is registered by the fingerprint image input device so as to identify the entrant with the registrant.

The spectrum transform makes it possible to reduce the data size compared to the data size of the fingerprint image, thus rendering it possible to build the device with a small scale architect system.

The fingerprint image is obtained by the frequency spectrum transform so that the positional displacement is absorbed from the fingerprint image. This makes it possible to maintain a high accuracy of the fingerprint collation when the positional displacement occurs between the fingerprint image patterns upon putting the finger on the prism.

In the feature extraction device, instead of the one-dimensional group-retardant spectrum transform, a two-dimensional group-retardant spectrum transform may be used which makes it possible to simultaneously refer to X- and Y-oriented frequency spectra, and isolating and emphasizing the individual peaks of the spectra so as to determine a spacing spectrum of the ridge pattern images when collating the feature portions upon identifying the entrant with the registrant. In the feature extraction device, a cepstrum (treating a logarithm of the spectrum with Fourier transform) may be used to determine the feature portions after obtaining the frequency spectrum or the spacing spectrum of the ridge pattern image when collating the feature portions upon identifying the entrant with the registrant.

According further to the invention, there is provided a fingerprint scanning device for use in identification. In the device, the feature extraction device includes a plural-feature extraction device which extracts a plurality of features of the entrant from the fingerprint image data. The distinction device includes a comprehensive distinction device which individually collates the entrant feature portion with a registrant feature portion which is registered by the fingerprint image input device, and identifying the entrant with the registrant on the basis of a plurality of collation results obtained by collating the entrant feature portion with the registrant feature portion.

The plural-feature extraction device makes it possible to individually collate the fingerprint pattern images comprehensively, thus enhancing the accuracy when identifying the entrant with the registrant.

It is observed that the plural-feature extraction device is superior in collating the fingerprint pattern images, and making it possible to prevent the entire architect system from outsizing by employing a small scale architect to each of the feature extraction devices.

In the plural-feature extraction device, a spacing frequency may be obtained by a two-dimensional Fourier transform of the fingerprint image as one of the feature portions of the fingerprint.

Various other objects and advantages to be obtained by the present invention will be understood in the following description with reference to the accompanying drawings.

BRIEF DESCRIPTION OF THE DRAWINGS

FIG. 3A is an explanatory view of a monochrome fingerprint image;

FIGS. 3B and 3C are views of group-delay spectra in the X and Y directions;

DETAILED DESCRIPTION OF PREFERRED EMBODIMENT

Figure 1:
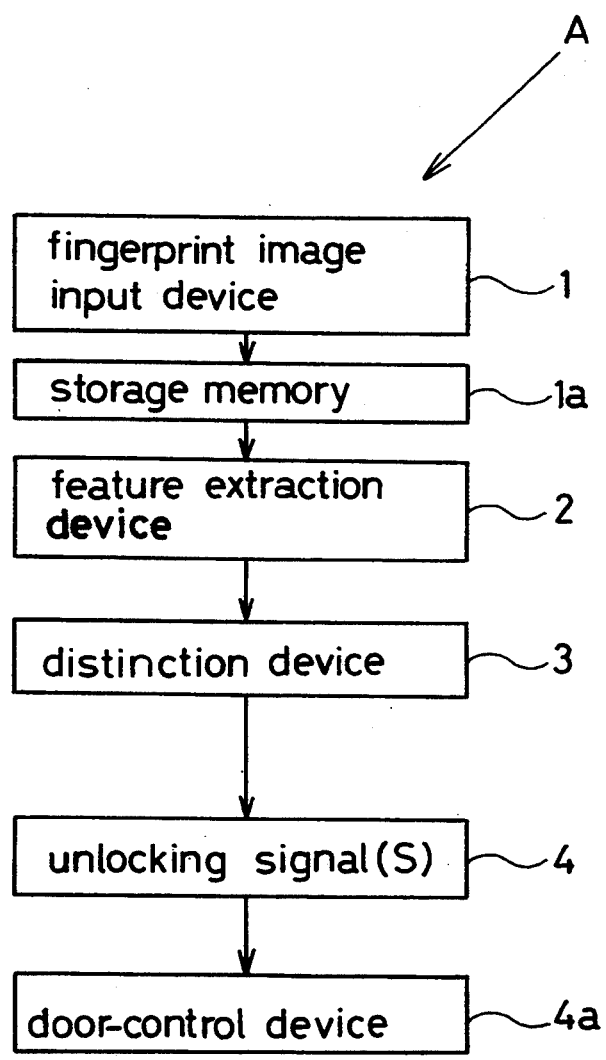
FIG. 1 is a block diagram according to the invention of a fingerprint scanning device for use in identification according to a first embodiment of the invention.
Figure 2:
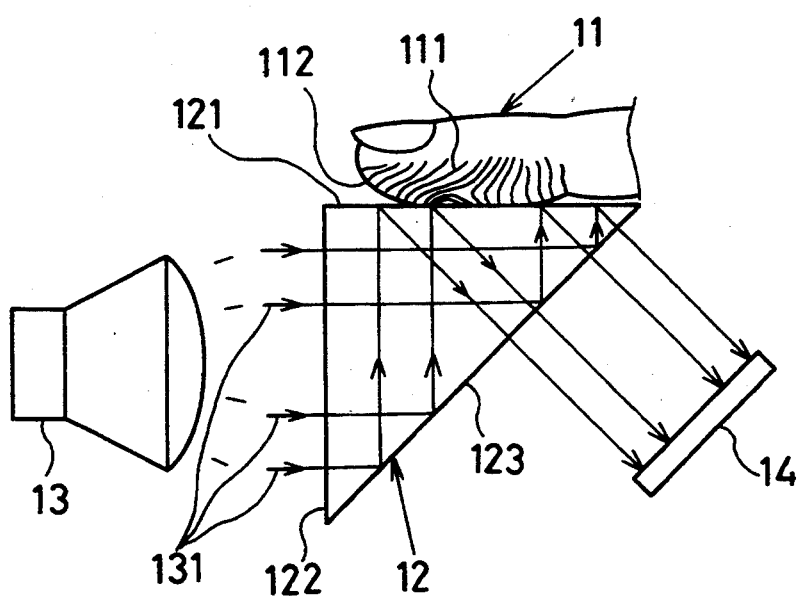
FIG. 2 is an explanatory view of a fingerprint image input device.

Referring to FIGS. 1 through 3, there is shown a fingerprint scanning device for use in identification (A). The device (A) has a fingerprint image input device 1 which has a storage memory circuit 1a to photoelectronically store an entrant fingerprint 111 of a specified finger 11 as a ridge pattern image 10. A feature extraction device 2 is provided to produce a frequency spectrum from the ridge pattern image 10. A distinction device 3 is provided to identify whether or not the entrant is a registrant. An output device 4 is provided to generate an unlocking signal (S) to transmit it to a door-control device 4a when the entrant is identified by the registrant.

The fingerprint image input device 1 has a triangular prism 12, on a lateral side 121 of which a fingerprint surface 112 of the entrant right forefinger 11 is put as shown in FIG. 2. A light source (e.g. LED) 13 emits light beams 131 directed to a vertical side 122 of the prism 12. The light beams 131 are adapted to reflect from the a hypotenuse side 123 of the prism 12, and then reflecting from the lateral side 121 of the prism 12 so as to impinge on a CCD (Charge Coupled Device Memory) 14 through the hypotenuse side 123 of the prism 12. The CCD 14 stores the light beams 131 as dark images which correspond to mountain portions of the ridge pattern while storing the light beams 131 as bright images which correspond to valley portions of the ridge pattern. The CCD 14 transmits the two-dimensional ridge pattern image 10 to the feature extraction device 2.

The feature extraction device 2 has a calculator which treats the ridge pattern image 10 with a one-dimensional group-delay spectrum transform in X- and Y-direction which has a characteristic of isolating and emphasizing peaks of the individual frequency spectra in the form of differential with respect to a phase component frequency in Fourier transform analysis.

As a result, the calculator determines group-delay spectra 21, 22 in X- and Y-direction respectively as feature portions of the fingerprint shown in FIGS. 3B and 3C. In this instance, the calculator may treat the ridge pattern image 10 with the one-dimensional group-delay spectrum transform in either X- or Y-direction.

In the distinction device 3, the feature portions (i.e. the group-delay spectra 21, 22) of the entrant are collated to those of the registrant. When at least one of the X-oriented and Y-oriented group-delay spectra is recognized as the same between the entrant and the registrant, it is decided that the entrant be identified as the registrant.

Upon collating the individual ridge pattern images, Euclidean distances of the entrant spectrum and the registrant spectrum are calculated respectively. When the Euclidean distances fall short of a predetermined threshold limit, the entrant is identified as the registrant. When the Euclidean distances exceed the predetermined threshould limit, the entrant is deemed not the same as the registrant. In this instance, the Euclidean distance is generally defined to show a physical interval between spectrum curves in multi-dimensional space, but the Euclidean distance practically used herein is to designate a degree of similarity between the fingerprint data.

Advantages according to the invention are as follows:

(a) In the distinction device 3, the calculator determines the group-delay spectra 21, 22 in X- and Y-direction respectively as feature portions of the fingerprint. The feature portion of the entrant are collated to that of the registrant. When at least one of the X-oriented and Y-oriented group-delay spectra is recognized as being the same between the entrant and the registrant, the entrant is identified as the registrant. Because the group-delay spectra 21, 22 are obtained by treating the ridge pattern image 10 with the one-dimensional group-delay spectrum transform, the spectrum pattern remains substantially unchanged when the ridge pattern image is distorted inadvertently because of different forces and angles with which the finger 11 is put on the lateral side 121 of the prism 12. This makes it possible to precisely collate the ridge pattern images to enhance the accuracy of identification.

In the case in which the entrant is identified as the registrant when either the X-oriented group-delay spectrum or the Y-oriented group-delay spectrum is mutually collated as the same, the possibility that the entrant not be mistakenly identified as the registrant is reduced to be significantly small because one of the group-delay spectra is not collated the same due to the disturbance noise.

(b) With the ridge pattern images of the fingerprint as feature portions, necessity of the large scale architect system is substantially obviated since there is no need to designate are ahead of time any actual feature portion of the fingerprint. The use of the one-dimensional group-delay spectrum makes it possible to reduce the data size of the ridge pattern image to approximately half the conventional size, thus enable the ridge pattern images to be collated at a relatively high speed with a small architect system. When it is necessary to store a number of registrants, the storage area of the feature portions becomes generally halved, as compared to the case in which the ridge pattern images themselves are stored.

(c) When either the X-oriented group-delay spectrum or the Y-oriented group-delay spectrum is mutually collated, the data size of the ridge pattern images is reduced to a quarter of the conventional size, thus to further enable the ridge pattern images to be collated at a high speed with a small architect system.

Figure 4:
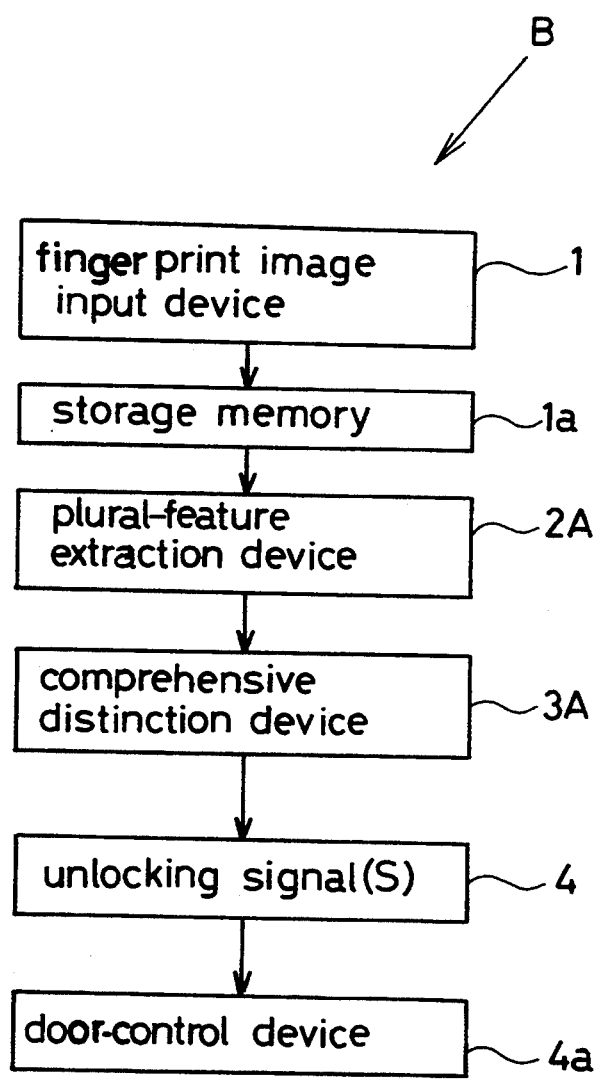
FIG. 4 is a block diagram according to the invention of a fingerprint scanning device for use in identification according to a second embodiment of the invention.
Figures 5, 6:
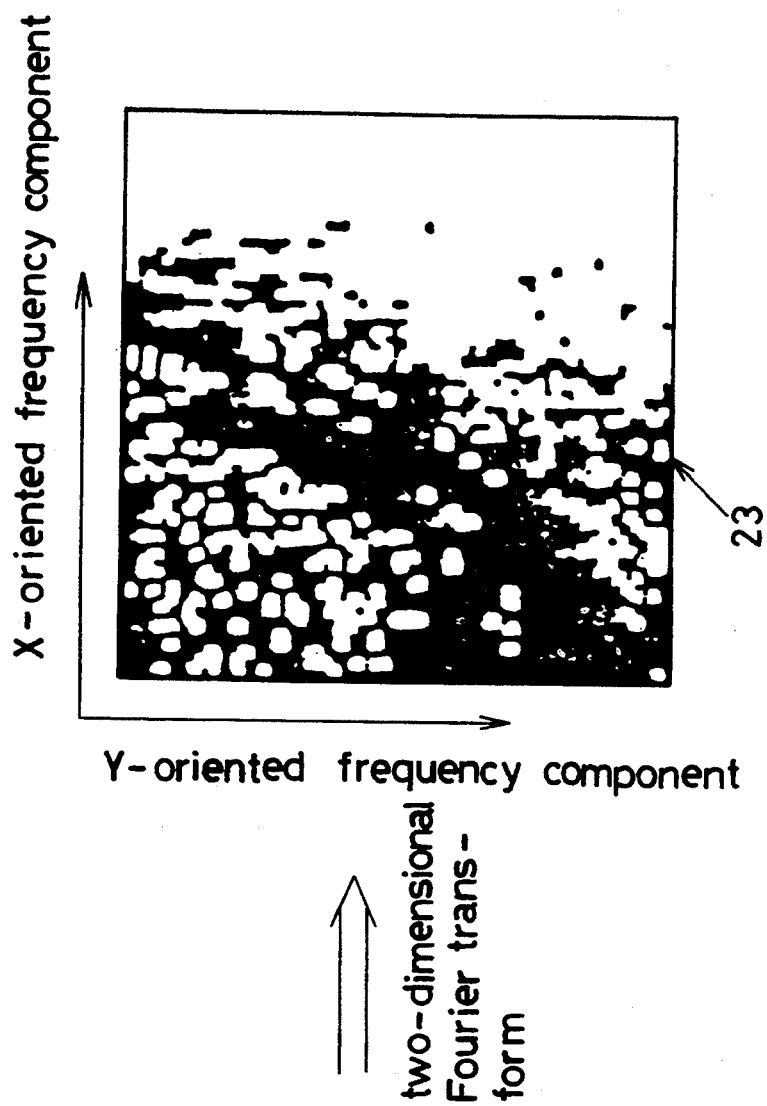
FIG. 5 is an explanatory view of a spacing spectrum before treating with Fourier transform.
FIG. 6 is an explanatory view of a spacing spectrum after treating with the Fourier transform.

Referring to FIGS. 4, 5 and 6, a second embodiment of the invention is described. In a fingerprint scanning device (B) for use in identification according to second embodiment of the invention, the device (B) has a plural-feature extraction device 2A into which the feature extraction device 2 is incorporated. The device (B) further has a comprehensive distinction device 3A into which the distinction device 3 is incorporated.

In addition to the calculator of the first embodiment, the plural-feature extraction device 2A has a calculator including a line-thinning portion, a central position determinant portion, a data pick-up portion and a two-dimensional Fourier transform portion. The line-thinning portion deletes thickness element of the ridge from the ridge pattern image to form a thinly lined data. The central position determinant portion determines a central position of the fingerprint on the basis of the thinly lined data. The data pick-up portion extracts a fingerprint portion area (e.g. 8.0 mm×8.0 mm) within a certain rectangular region from the central position of the fingerprint. The two-dimensional Fourier transform portion determines a two-dimensional Fourier transform image (spacing spectrum 23) on the basis of the data pick-up portion.

The comprehensive distinction device 3A executes a secondary collation in addition to a primary collation which the distinction device 3 executes in the first embodiment of the invention. When it is recognized that the ridge pattern images correspond to each other by either the primary collation or the secondary collation, the entrant is identified as the registrant. In the primary collation, the group-delay spectra are compared between the entrant and the registrant. The entrant is identified as the registrant when either the X-oriented group-delay spectrum or the Y-oriented group-delay spectrum mutually correspond as described in the first embodiment of the invention. In the secondary collation, the spacing spectrum pattern 23 of the entrant is collated to that of the registrant. When the collation degree exceeds a predetermined threshould, the entrant is identified as the registrant.

Advantages according to the second embodiment of the invention are as follows:

The device (B) according to the second embodiment of the invention selectively employs the primary collation and the secondary collation so that the entrant is identified as the registrant when the ridge pattern images correspond to each other by either the primary collation or the secondary collation. This makes the device (B) superior in distinguishing the entrant fingerprint to the registrant fingerprint.

Therefore, the possibility that the entrant is not mistakenly identified as the registrant is reduced to be significantly small when the ridge pattern image is out of place inadvertently because of different forces and angles with which the finger 11 is put on the lateral side 121 of the prism 12.

It is noted that in order to extract the feature portion of the fingerprint, the ridge pattern image may be treated with a two-dimensional group-delay spectrum transform which simultaneously observes X- and Y-oriented frequency spectrum and isolates and emphasizes individual peaks of the frequency spectrum instead of being treated with the one-dimensional group-delay spectrum transform.

It is appreciated that in the feature extraction device, a cepstrum may be used as a feature portion of the fingerprint after the frequency spectrum or the spacing spectrum of the ridge pattern image has been extracted.

In this instance, the cepstrum is expressed as an inverse Fourier transform with the short-time spectrum amplitude as a logarithmic scale.

It is also observed that in the second embodiment of the invention, the entrant is identified as the registrant when their ridge pattern images are confirmed as the same by either the primary collation or the secondary collation, the entrant however may be identified as the registrant only when his ridge pattern images are confirmed to be the same by both the primary collation and the secondary collation.

Various other modifications and changes may also be made without departing from the spirit and the scope of the following claims.

What is claimed is:

1. A fingerprint scanning device for use in identification comprising:
    a fingerprint image input means adapted to photoelectronically input a specified fingerprint of an entrant, and storing two-dimensional monochrome image data of a ridge pattern of the entrant fingerprint as fingerprint image data;
    a feature extraction means having a calculator which treats the ridge pattern image with one-dimensional group-delay spectrum transform in X- and Y-directions which has a characteristic of isolating and emphasizing peaks of the individual frequency spectra in the form of differential with respect to a phase component frequency in Fourier transform analysis, and determining group-delay spectra in X- and Y-directions, respectively, as fingerprint feature portions; and
    a distinction means provided to collate the entrant feature portion with a registrant feature position which is registered by the fingerprint image input means so as to identify the entrant with the registrant when at least one of X-oriented and Y-oriented group-delay spectra is recognized to be the same between the entrant and the registrant by calculating whether Euclidean distances fall short of a predetermined threshold limit upon collating the individual ridge pattern image.

2. In a fingerprint scanning device for use in identification as recited in claim 1, wherein the feature extraction means comprises a plural-feature extraction means including the group-delay spectrum transformation and the Fourier spectrum transformation or the like which extracts a plurality of features of the entrant from the fingerprint image data; and
    wherein the distinction means comprises a comprehensive distinction means which individually collates the entrant feature portion with a registrant feature portion registered by the fingerprint image input means;
    wherein the entrant is identified as the registrant on the basis of a plurality of collation results obtained by collating the entrant feature portion with the registrant feature portion.

* * * * *